United States Patent
Saileshwar et al.

(10) Patent No.: US 10,540,297 B2
(45) Date of Patent: Jan. 21, 2020

(54) MEMORY ORGANIZATION FOR SECURITY AND RELIABILITY

(71) Applicant: ARM LTD, Cambridge (GB)

(72) Inventors: Gururaj Saileshwar, Austin, TX (US); Prakash S. Ramrakhyani, Austin, TX (US); Wendy Arnott Elsasser, Austin, TX (US)

(73) Assignee: Arm Limited, Cambridge (GB)

( * ) Notice: Subject to any disclaimer, the term of this patent is extended or adjusted under 35 U.S.C. 154(b) by 225 days.

(21) Appl. No.: 15/668,322

(22) Filed: Aug. 3, 2017

(65) Prior Publication Data

US 2019/0043600 A1    Feb. 7, 2019

(51) Int. Cl.
*G06F 12/00*    (2006.01)
*G06F 12/14*    (2006.01)
*G11C 29/08*    (2006.01)

(52) U.S. Cl.
CPC .. *G06F 12/1408* (2013.01); *G06F 2212/1052* (2013.01); *G11C 29/08* (2013.01)

(58) Field of Classification Search
None
See application file for complete search history.

(56) References Cited

U.S. PATENT DOCUMENTS

| | | | |
|---|---|---|---|
| 10,243,990 B1 * | 3/2019 | Chen | H04L 63/1466 |
| 2009/0019551 A1 | 1/2009 | Haga et al. | |
| 2010/0212017 A1 | 8/2010 | Li et al. | |
| 2011/0138192 A1 * | 6/2011 | Kocher | G06F 21/602 |
| | | | 713/189 |
| 2015/0317256 A1 | 11/2015 | Boivie et al. | |
| 2016/0275018 A1 * | 9/2016 | Chhabra | G06F 21/79 |
| 2016/0283405 A1 * | 9/2016 | Oh | G06F 12/0875 |
| 2016/0328335 A1 * | 11/2016 | Bhattacharyya | H04L 9/0637 |
| 2017/0083724 A1 * | 3/2017 | Chhabra | G06F 21/72 |

(Continued)

FOREIGN PATENT DOCUMENTS

WO    2017058408 A3    5/2017

OTHER PUBLICATIONS

Ruirui Huang and G. Edward Suh. 2010. IVEC: off-chip memory integrity protection for both security and reliability. In Proceedings of the 37th annual international symposium on Computer architecture (ISCA '10). ACM, New York, NY, USA, 395-406. DOI: https://doi.org/10.1145/1815961.1816015.

(Continued)

*Primary Examiner* — Khalil Naghdali
*Assistant Examiner* — Arezoo Sherkat
(74) *Attorney, Agent, or Firm* — Leveque IP Law, P.C.

(57) ABSTRACT

A method and apparatus for retrieving data from a memory in which data, an associated message authentication code (MAC) and an associated error correction code (ECC) are stored in a memory such that the data, MAC and ECC can be retrieved together in a single read transaction and written in a single write transaction. Additional read transactions may be used to retrieve counters values that enable the retrieved MAC to be compared with a computed MAC. Still further, node value values of an integrity tree may also be retrieved to enable hash values of the integrity tree to be verified. The MAC and ECC may be stored in a metadata region of a memory module, for example.

17 Claims, 6 Drawing Sheets

(56) References Cited

U.S. PATENT DOCUMENTS

2017/0091119 A1\* 3/2017 Chhabra ............. G06F 12/0802
2018/0189132 A1\* 7/2018 Malladi ............... G06F 11/1044

OTHER PUBLICATIONS

Chenyu Yan, Brian Rogers, Daniel Englender, Yan Solihin, Milos Prvulovic, "Improving Cost, Performance, and Security of Memory Encryption and Authentication," Proceedings of the 33rd International Symposium on Computer Architecture (ISCA-33), Jun. 2006.
Gueron, S. (2016). A Memory Encryption Engine Suitable for General Purpose Processors. IACR Cryptology ePrint Archive, 2016, 204.
W. Eric Hall and Charanjit S. Jutla. 2005. Parallelizable authentication trees. In Proceedings of the 12th international conference on Selected Areas in Cryptography (SAC'05), Bart Preneel and Stafford Tavares (Eds.). Springer-Verlag, Berlin, Heidelberg, 95-109. DOI= 10.1007/11693383_7 http://dx.doi.org/10.1007/11693383_7.
Bedichek, Robert, "Some efficient architecture simulation techniques," Winter 1990 USENIX Conference, pp. 53-63.

\* cited by examiner

MEMORY ORGANIZATION FOR SECURITY AND RELIABILITY

BACKGROUND

In many applications is it necessary to be able to secure and verify the integrity of data stored in a computer memory. Memory security involves protection against an adversary with physical access to the system, possessing ability to observe, tamper and/or replay the data being exchanged between a secure microprocessor and an off chip non-secure system memory. Securing commodity memory, such as dynamic random access memory (DRAM) requires accessing security metadata from memory every time off-chip data is accessed. The metadata may include counters that are used for encryption and ensuring integrity, and Message Authentication Codes (MACs) used for verifying integrity. In addition, an integrity tree data may be accessed for protection against a 'replay' attack. The integrity tree may be constructed as a tree of counters or a tree of MACs, with the root stored on-chip (within the secure region). In additional to using more memory for storing the metadata, the requirement to access additional memory have a negative impact of the performance of a system.

Systems for memory security and reliability may be combined, since MACs stored in memory detect tampering of memory contents can also detect random errors in memory with high probability. It has been proposed to combine MACs for detection of memory errors with chip-level parity for correction of errors, so as to achieve high levels of reliability with commodity DRAM dual inline memory modules (DIMMs).

Additional memory may be provided for storing error correction codes (ECCs). For example, server memories such as ECC-DIMMs may be provisioned with 12.5% additional storage and bus-width for error correction codes.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide a memory system for use in a data processing system. In accordance with certain representative embodiments of the present disclosure, the memory system combines reliability and security with efficient performance.

Figure 1:
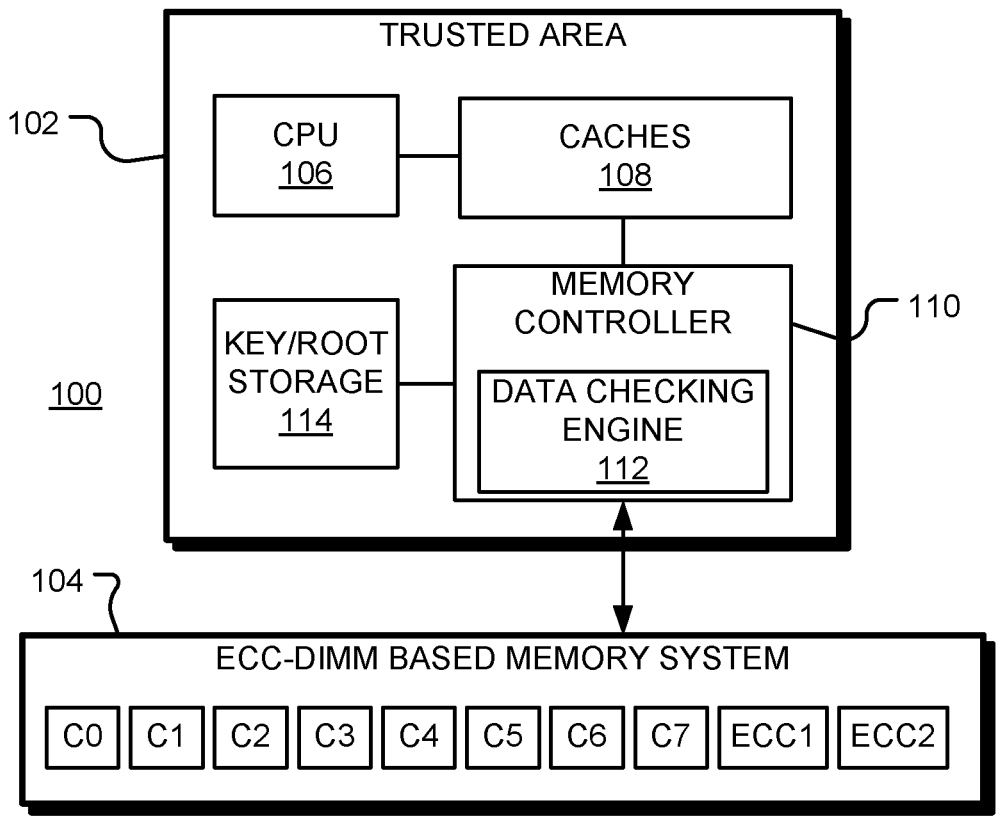
FIG. 1 is a top level block diagram of a data processing system, consistent with embodiments of the disclosure.

FIG. 1 is a top level block diagram of a data processing system 100 that includes a processing chip 102 and an off-chip memory module 104, consistent with embodiments of the disclosure. In one embodiment, memory module 104 is a dual inline memory module (DIMM) that includes a number of memory chips (C0-C7 in this example) in addition to one or more additional chips (ECC1 and ECC2) for storing metadata. The additional chips may be used, for example, for storing error correcting codes (ECCs) for detecting and correcting bit errors in the data stored in chips C0-C7. Processing chip 102 may be a system-on-a-chip (SoC) for example, and may include one or more processing cores 106, high speed caches 108 and a memory management unit 110 for accessing memory module 104. Processing chip 102 may also include data checking engine 112 for performing operations related to the reliability and the security or integrity of data stored in memory module 104. For example, when data is read from the memory module, data checking engine 112 may check error correcting codes to identify and (if possible) correct bit errors in the data. Data checking engine 112 may also perform operations related to data integrity or security. Storage element 114 may be used to store other data values, such as secret keys and hash values, that relate to data security.

Data checking engine 112 may encompass a processor, controller, microcontroller unit (MCU), microprocessor, controlled by programming instructions. Alternatively, some or all functions of data checking engine 112 could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Other values associated with data security, and referred to herein as metadata, may be stored in memory module 104 together with the data itself. On aspect of the present disclosure relates to an efficient arrangement of data in memory module 104 that provides reliability, security and improved performance.

There are three aspects to securing data, stored in off-chip memory, from a malicious adversary with physical access to the system and an ability to observe and/or replay the data or code being exchanged between a microprocessor and off chip system memory.

1) Ensuring privacy, i.e. preventing a malicious observer from interpreting the data being read from or stored on to off chip memory. Privacy may be ensured by encrypting data on that chip before it is written to off-chip memory and decrypting it after it has been read from memory.

2) Detecting modification of the encrypted data. This is can be achieved by storing, along with data, message authentication codes (MACS) generated using one-way functions such as AES-GCM or SHA-256.

3) Preventing replay attacks—where a malicious person with physical access to the system stores a legitimate combination of data and MAC observed previously on the bus and replays on to the bus later with an intent to corrupt data at a given memory location with stale values.

Figure 2:
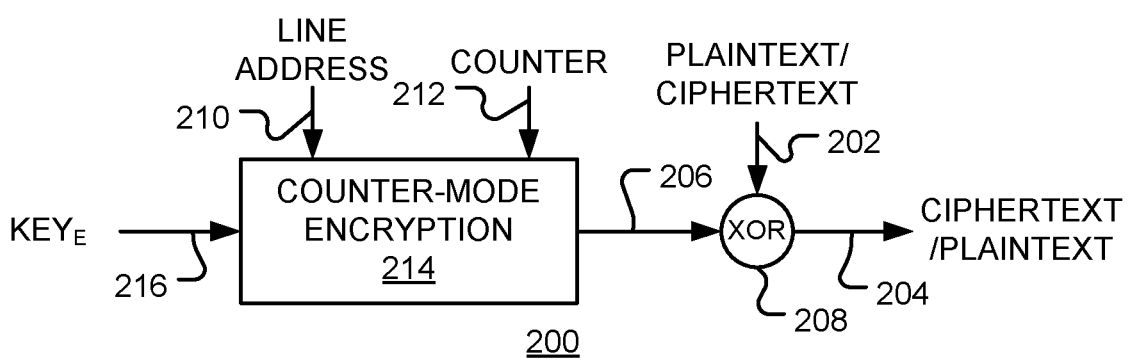
FIG. 2 is a block diagram of an encryption/decryption unit for ensuring data privacy, consistent with embodiments of the disclosure.

FIG. 2 is a block diagram of an encryption/decryption unit 200 for ensuring data privacy. Encryption/decryption unit 200 forms part of the data checking engine, discussed above. For encryption, the unit receives a plain-text or non-encoded message block 202 and produces a cipher-text or encoded message 204 by performing an XOR operation between the message block 202 and a one-time-pad 206 in XOR unit 208. The one-time-pad 206 is obtained from a line address 210 of the data and a counter value 212 in counter-mode encryption unit 214 using a secret key 216. The counter value acts as a seed and is incremented each time a new pad is generated. Encryption unit 214 may be configured in accordance with the widely used Advance Encryption Standard (AES), for example. The counter value 212 may be incremented each time a message block is encrypted to ensure that repeated message blocks produce different cipher-texts. Operation for decryption is the same, since the XOR operation selected flips bits in the message block and repeating the operation flips them back to the original values. However, it is noted that the counter value used for encryption must be known in order to decrypt a block.

Figure 3:
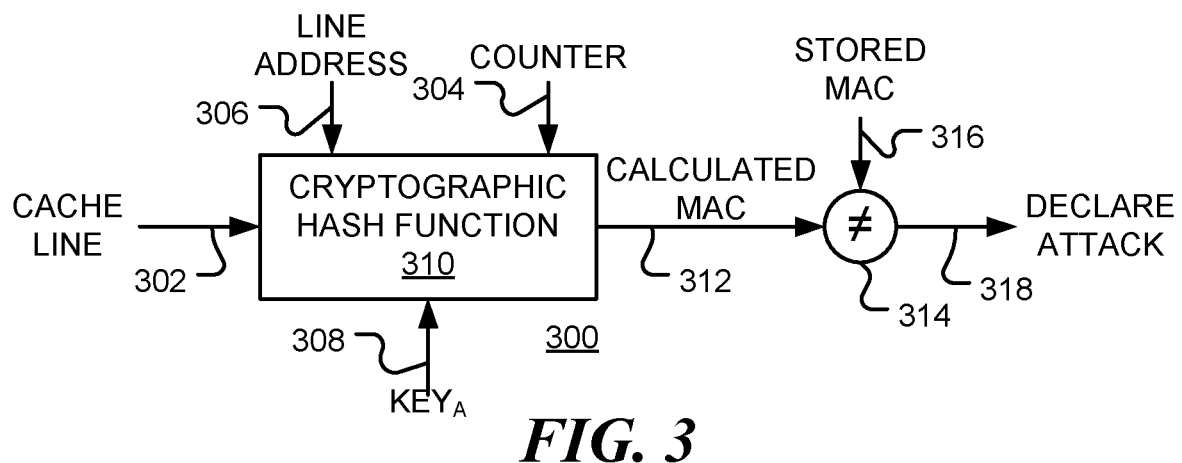
FIG. 3 is a block diagram of a message authentication unit, consistent with embodiments of the disclosure.

FIG. 3 is a block diagram of a message authentication unit 300 that includes a Message Authentication Code (MAC) generator and comparison logic. Message authentication unit 300 forms part of the data checking engine, discussed above. A block of data 302, such as a cache line (64 bytes, for example), a counter value 304 (8 bytes, for example), a line address 306 and a secret key 308 are passed to a cryptographic hash function 310. The hash function produces a Message Authentication Code (MAC) 312, which may be 8 bytes for example. When storing data, the calculated MAC 312 is stored as well. When reading data, both the data and the associated stored MAC are read. The calculated MAC 312 is compared in comparison logic 314 to the stored MAC 316. If they match, the data is assumed to be authenticated. If they don't match, line 318 is asserted to indicate that the data or the MAC has been altered, possibly in a tampering attack.

Replay attacks can be prevented by using an Integrity Tree. An example is a Merkle Tree. This is an integrity tree of hashes, where blocks of contiguous memory (N at a time) are reduced using a hashing algorithm to a tag of size equal to the size of 1 block and then these tags are reduced (N at a time) recursively. Since all data stored on the processor chip is secure by definition, the root of the Merkle tree is always stored on chip. Alternately, a Counter-tree or a Parallelizable Authentication Tree could also be used for the same purpose, with the advantage that updates to different levels of the tree is possible in parallel.

Figure 4:
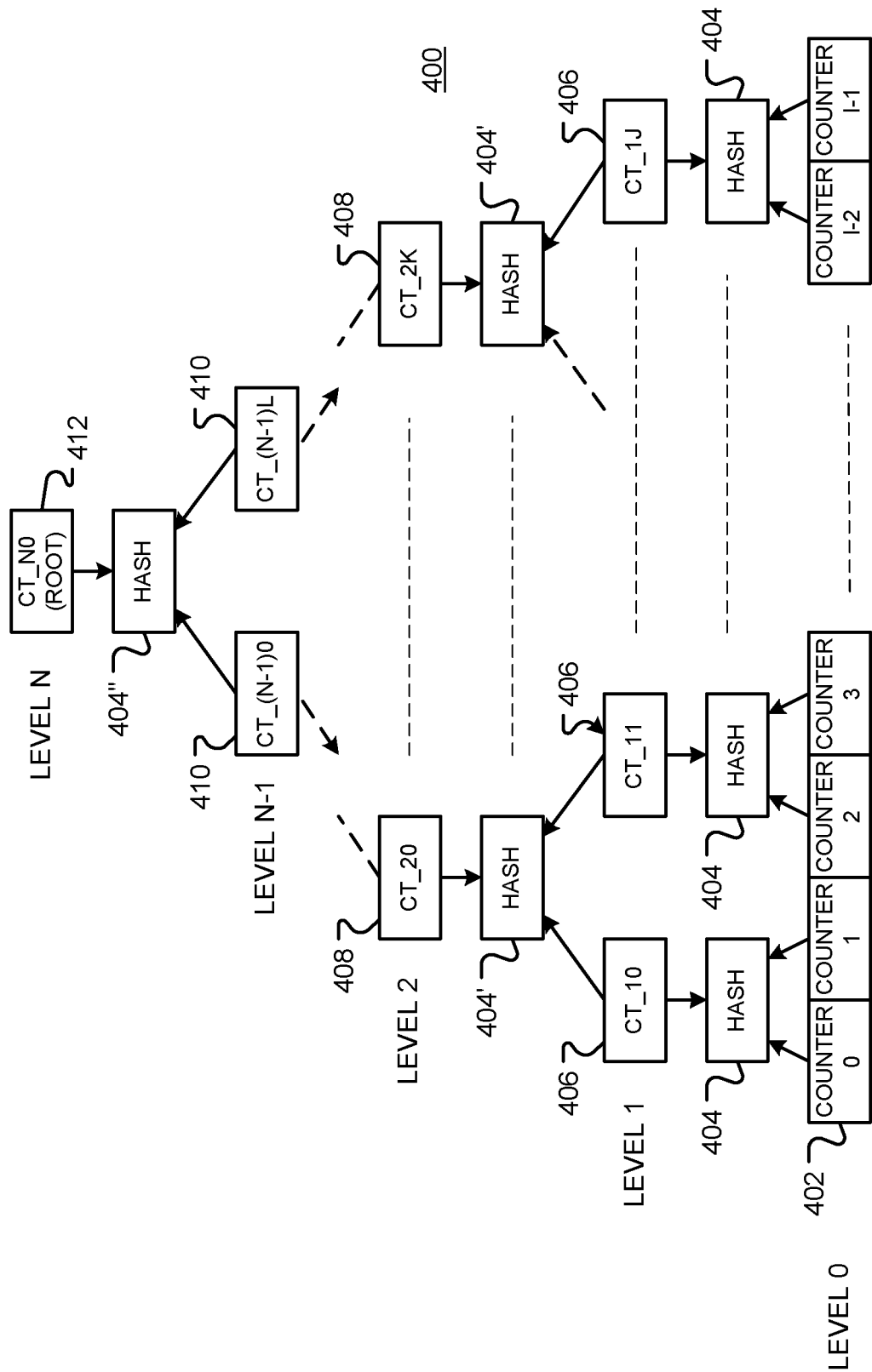
FIG. 4 is a block diagram illustrating an integrity tree for counters, consistent with embodiments of the disclosure.

FIG. 4 is a block diagram illustrating an integrity tree 400 for counters. An integrity tree is a data structure that is computed from a data set (a set of counters 402 in this case) and supplies a set of numbers that may be used to determine if any members of the data set have been modified. The initial level (the leaves of the tree, level 0) comprises the counter values. In the example shown, each pair of counters 402, together a level 1 node value 406, are used to generate a hash value 404. Each pair of nodes 406 in level 1, together with a level 2 node value 408, are used to compute a hash value 404'. This process continues for successive levels until nodes 410 in level N−1 of the tree are used with final node 412 in level N to generate hash value 404''. The final node is called the root. In this simple example, each hash value 404 combines two counter values 402 (and node value 406). However, in general, two or more counter values may be used to compute each hash value. For example, eight counter values may be used to compute each hash value, and eight level 1 node values used to compute each level hash value. In a further example, 64 counter values are used to compute each level 1 hash value, and 64 level 1 node values are used to compute each level 2 hash value. Increasing the number of counters combined reduces the number of nodes in the counter integrity tree for a given size of memory.

The node values and counter values are stored in the memory and/or a lowest level cache.

As discussed above, a memory stores the data itself (which may be encrypted), MACs for the data, and counter values (402) used to generate the MACs (and encrypted values). In addition, the memory stores the nodes values (406, 408, 410) of the counter integrity tree. The root value 412 of the counter integrity tree may be stored on-chip. At least some of the hash values are stored to eliminate the need to compute the entire counter integrity tree.

In operation, when a data value is read from the memory, the associated counter value is read from the memory. In addition, nodes values in the counter integrity tree are read to facilitate computation of the tree. For example, referring to FIG. 4, if data associated with counter 1 is read, counters 0 and 1 and counter tree (CT) node CT_10 are read to enable computation of the has value. Counter tree nodes CT_10, CT_11 and CT20 are read to enable computation of hash value 404', etc. Some of the hash values may be stored on-chip (for example, recently used values may be present in a cache). When an on-chip node value is available for a computed hash value, the computation can stop and the computed value is compared with the stored value, as described above with reference to FIG. 3. If any of the values read from the memory (data, MACs, counters, node values) has been tampered with (or subject to a bit error), the computed hash value will not match the stored hash value. Checking the hash values is performed by the data checking engine, discussed above.

In order to detect bit errors, error correction codes, such as parity values or Hamming codes, may be stored for each cache line.

Every off-chip access for data, generates additional memory accesses—one for a counter (required for encryption/decryption of data and MAC computation), one for the MAC (to ensure integrity of the data) and up to 'D' additional accesses for the Integrity Tree (where D is the depth of the counter integrity tree).

Prior systems seek to reduce the impact of increased memory traffic on performance for an application by caching the MAC and MAC-based Integrity Tree entries either in a cache along with data.

In accordance with the present disclosure, the counter values and node values of a counter-based integrity tree are stored in a lowest level cache (LLC).

In accordance with a further aspect of the present disclosure, storage of the data, MAC, error correction codes, counter values and integrity tree values in the memory is arranged to optimize the performance of the system. In particular, the number of read operations from the memory is minimized by storing data, the associated MAC and the associated error correction code (ECC) such that they can be retrieved in a single read transaction. In addition, the data, MAC and ECC can be written in a single write transaction.

Future DDR5 ECC-DIMMs are projected to provide 25% additional storage and bus-width for RAS support compared to commodity DIMMs. The modules may be configured as eight data chips and two metadata chips, each with an 8-bit wide data bus, for example, for a total bus width of 80-bits. This enables 64-bytes of data and the associated metadata to be read in 8 bursts. In a further embodiment, the modules are configured as 4-bit wide devices, enabling 64-bytes of data to be read in 16 bursts. Other configurations may be used without departing from the present disclosure. However, when a metadata region is provided in the memory, this region may be used to store a MAC and an error correction code (ECC).

Figure 5:
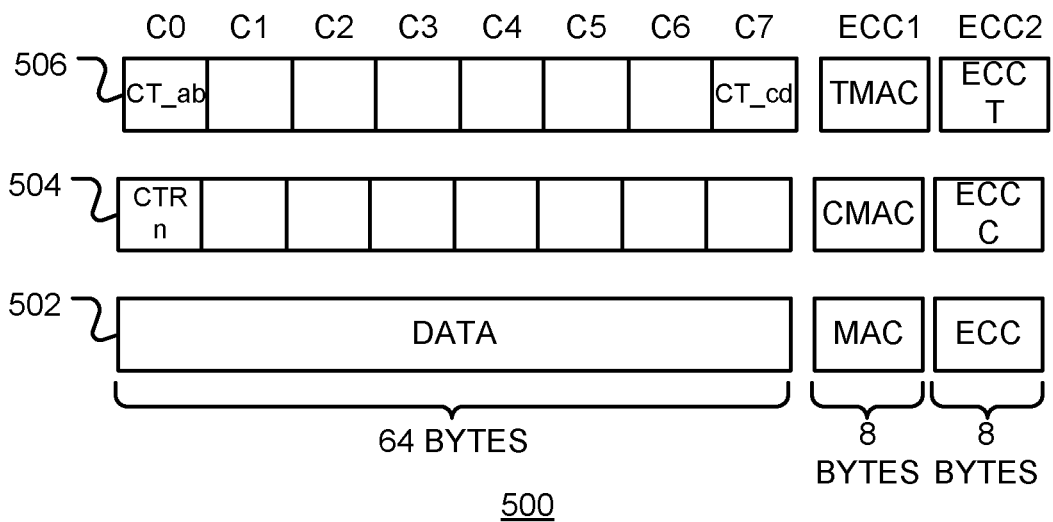
FIG. 5 is a diagrammatic representation of data arrangement in a memory, consistent with embodiments of the present disclosure.

FIG. 5 is a diagrammatic representation of data arrangement 500 in a memory module, consistent with embodiments of the present disclosure. In this example, a single read transaction provides 64 bytes of data and 16 bytes of metadata. The data and metadata are stored in memory module that includes eight chips (C0-C7) for storing data and two chips (ECC1 and ECC2) for storing metadata. In a single transaction (read access) each data chip provides 8 bytes of data and each ECC chip provides 1 byte of metadata that might constitute a 64 byte cache line along with 16 bytes of metadata. Each read access returns a cache line in a number of bursts over a data bus. The bus width may be 80-bits (64+16), for example, in which case a complete line is read in eight bursts over the bus. However, it will be apparent to those of ordinary skill in the art that various combinations of chip size, bus width and burst length may be used without departing from the present disclosure, provided that data, ECC and MAC may be read together in a single transaction.

In the example shown in FIG. 5, line 502 indicates how 64 bytes of data and 16 bytes of metadata, corresponding to data returned in a single read access are allocated between chips in a memory module. The data is stored chips C0-C7. An 8 byte MAC for the data in chip ECC1 and an 8 byte error correction code (ECC) is stored in chip ECC2. Of course, the MAC and ECC may alternatively be stored in ECC2 and ECC1, respectively, without departing from the disclosure. The ECC may be computed from both the data and the MAC. Line 504 indicates the allocation of counters. In one embodiment, line 504 contains the counter used to compute the MAC in line 502 and all of the other counters used to compute the first node value in the counter integrity tree. For example, line 504 may contain eight 8-bit counters for an 8-way integrity tree, in which each hash function takes 8 counters as input. These same counters are used for 8 data lines so, in this example, counter storage is no more than $1/8^{th}$ of the available storage. Other size counters may be used. For example, in a further embodiment, split counters are used. As is known in the art, split counters comprise a major part and a minor part. The major part is common to many data lines (a whole page worth for example). The minor parts (incremented with each write) are stored in line 504 so the amount of storage for counters is greatly reduced. The major part of the counter is incremented when a minor counter rolls over. Of course, counters may be decremented rather than incremented.

In order to detect tampering with the counter values, line 504 includes a MAC value (CMAC) for the counter values in the line and an ECC (ECC C) for the line.

Line 506 indicate storage allocation for node values of the counter integrity tree. The number of nodes to be stored depends upon the structure of the tree. For example, for an eight-way tree, the memory required for counter values and nodes values is approximately $1/7^{th}$ of the data memory. In order to detect tampering with the counter tree node values, line 506 includes a MAC value (TMAC) for the tree node values in the line and an ECC (ECC T) for the line. These are stored in chips ECC1 and ECC2.

An advantage of the memory arrangement shown in FIG. 5 is that the data and the associated MAC and ECC may be retrieved in a single read access for line 502. In addition, the counter values needed to evaluate the counter integrity tree may also be retrieved in a single read access of line 504. The number of integrity node values to be read depends upon the structure of the integrity and also upon which node values are already stored on-chip prior to the access.

In contrast, in prior approaches, the MAC values are stored in a separate line and require an additional read operation. Thus, the disclosed arrangement reduces memory traffic and improves performance.

One aspect of the disclosure approach is the use of a counter integrity tree, rather than a MAC or data integrity tree, in combination with the disclosed memory arrangement. With either MAC or data integrity tree, multiple lines would need to be read to enable computation of the first node value in the integrity tree In addition to securing data stored in memory, it is also desirable to ensure that the data is reliable by detecting bit errors and, if possible, correcting bit errors. This may be done through the use of error correcting codes (ECCs). For example, server memories such as ECC-DIMMs may be provisioned with additional storage and bus-width that enables error correction codes to be stored and read at the same time as the associated data.

One aspect of the disclosure relates to a method for retrieving data from a memory, such as a memory module, having a plurality of addressable lines, each addressable row containing a data region and a metadata region. Data and a first stored message authentication code (MAC) associated with the data are read from a first addressable line at a first line address in the memory module, where the data is stored in the data region of the first addressable line and the MAC is stored in the metadata region of the first addressable line. A number of counter values are read from a second addressable line in the memory module. The first stored MAC was generated from the data and a first counter value of the plurality of counter values. A first computed MAC is generated from the data, a first secret key, the first counter value and (optionally) the first line address. The data is deemed to be reliable when the first stored MAC, read from the memory module, is equal to the first computed MAC.

In addition, error correction codes may be read from the metadata region of the first addressable line in the memory module and used to determine if one or more bit errors in the data or the first MAC may be corrected. The data is deemed to be reliable when the first stored MAC is equal to the first computed MAC after correction any bit errors in data or the first MAC determined to be correctable.

As a check of data integrity, node values of a counter integrity tree may be checked against one or more trusted node values (which may be stored on-chip, for example).

Node values of nodes in an initial level of a counter integrity tree are set to the counter values read from the second addressable line in the memory module. Node values are then iteratively computed, level-by-level, from the read counter values and other node values read from memory device. The computation continues until the value of a node is computed for a which a trusted node value is available for comparison. The data is determined to be secure when the trusted node value and the computed node value are equal and the stored MAC and computed MAC are equal.

Figure 6:
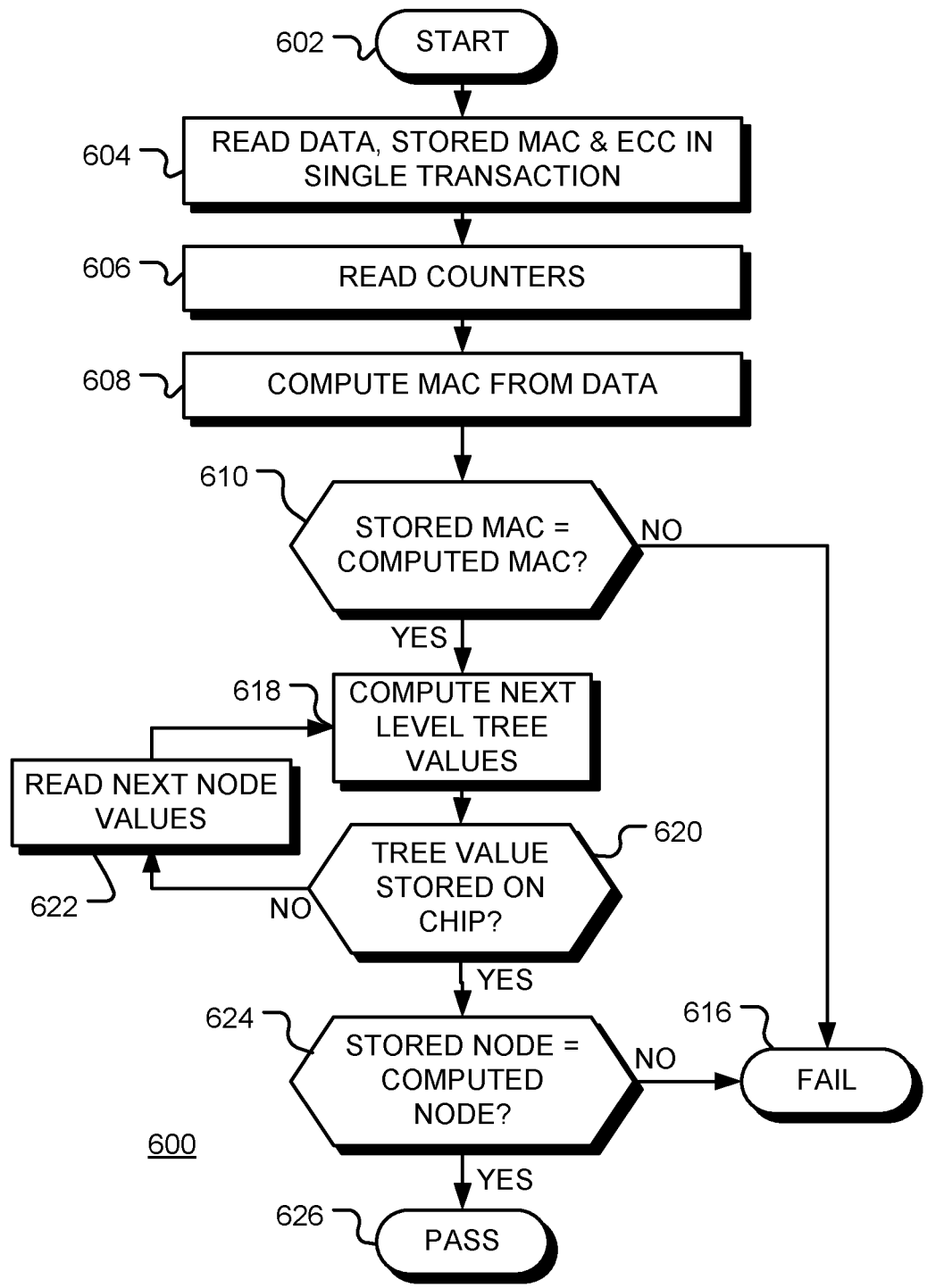
FIG. 6 is a flow chart of a method for reading and authenticating data stored in a memory, consistent with embodiments of the disclosure.

FIG. 6 is a flow chart of a method 600 for reading and authenticating data stored in a memory, consistent with embodiments of the disclosure. Following start block 602, the stored data, a stored MAC and an ECC are read in a single read transaction at block 604. At block 606, a corresponding counter value is read in a second read transaction. The MAC for the data is then computed at block 608, as described above with reference to FIG. 3, and compared with the stored MAC at block 610. If the stored MAC and the computed MAC do not agree, as depicted by the negative branch from decision block 610, the data is deemed to be unreliable and the read is failed at block 616. Otherwise, as depicted by the positive branch from decision block 610, flow continues to block 618, where checking the of the counter integrity tree is started. At block 618, the counter values read at block 606 are used together with a level 1 node value to compute a first level hash value. If a trusted value of the first level hash value is not available (it may be stored in an on-chip cache, for example, as result of a previous read), as depicted by the negative branch from decision block 620, node values are read from the memory module at block 622 to enable computation of the next level hash value at block 618. This process continues until the hash value for which a trusted value is available has been computed, as depicted by the positive branch from decision block 620. At decision block 624, the computed hash value is compared to the stored hash value. If they do not match, as depicted by the negative branch from decision block 624, it is assumed that the integrity of the memory module has been compromised and the read fails at block 616. Otherwise, the data read at block 604 is deemed to be reliable and the process terminates at block 626.

It is noted that MAC and ECC associated with the counter values and nodes values are also read and, at each step, are used to determine if the associated values are reliable (or can be made reliable by the correction of bit errors). These values are stored in the same cache lines as the associated counters and node values, as described with reference to FIG. 5.

In prior systems, MACs are stored separately from data. Thus, at least two memory accesses are required for each data access—one access retrieves the data (and any error correcting code) and another retrieves the associated MAC. Additional reads may be required to access counters and integrity values. In contrast, with the disclosed memory arrangement, data and MAC are stored in the same line of memory, requiring only a single memory access.

Figure 7:
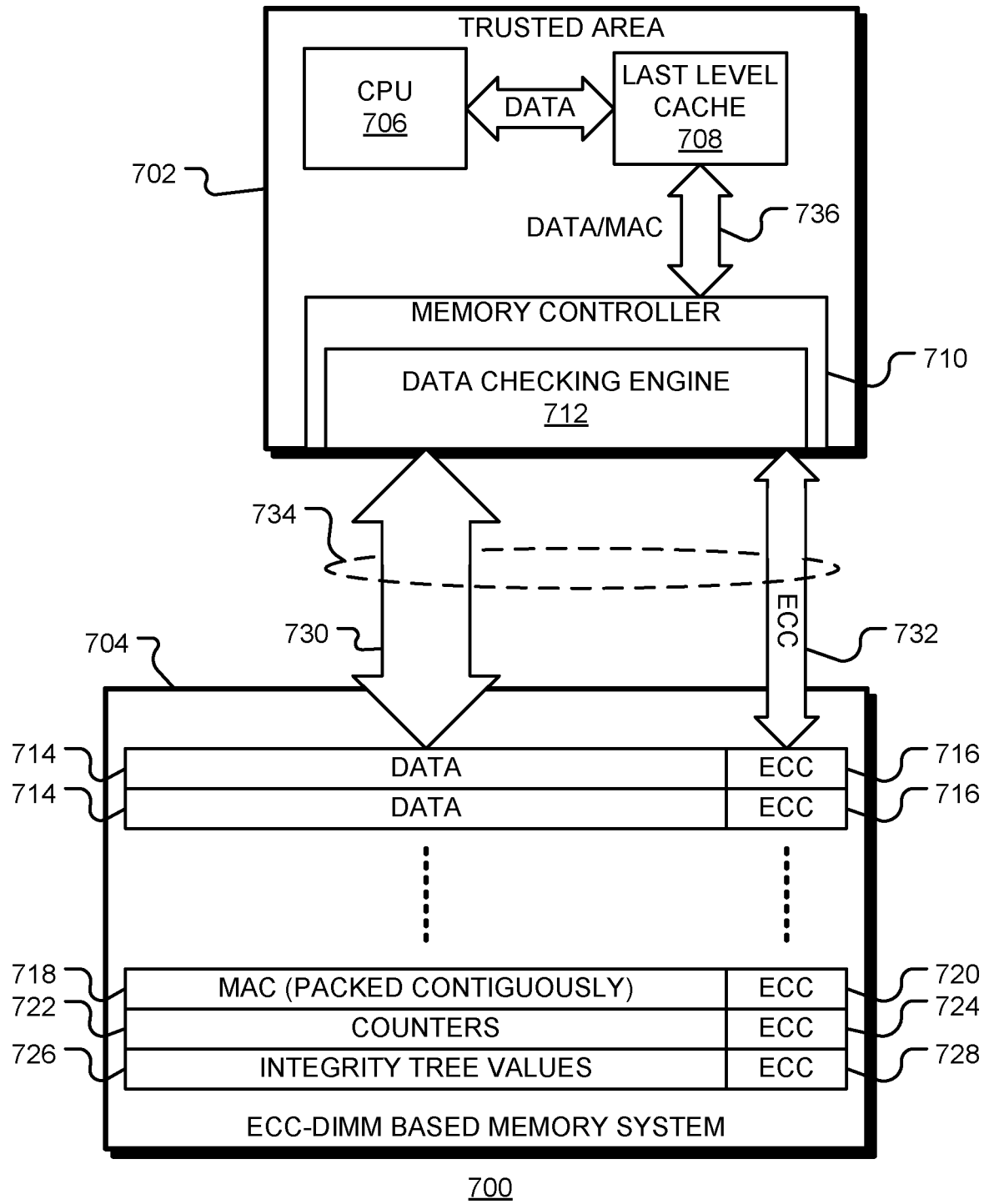
FIG. 7 is a block diagram of a data processing system with data security and reliability checking, consistent with embodiments of the disclosure.

FIG. 7 is a block diagram of a prior data processing system 700 that includes a trusted area 702, such as a system on a chip (SoC), and a memory system 704. The memory system may be based on ECC-DIMMs, for example. Trusted area 702 includes processing core 706 that accesses data in a last level cache (LLC) 708. Memory controller 710 moves data between the LLC and the off-chip memory system 704. The memory controller includes data checking engine 712. The memory system 704 stores data 714 that may be logically arranged in the memory as a number of addressable lines, which may correspond to cache lines. Associated with each line is a metadata region that is used to store an error correction code (ECC) 716. Additional lines contain MACs that are packed contiguously into a data region 718 with an ECC in the associated metadata region 720. Data region 722 stores counter values, with associated ECCs in metadata region 724. Data region 726 stores integrity tree values, with associated ECCs in metadata region 728.

Data 730 from the data region of a line and ECC 732 from a metadata region of a line are read together in a single transaction 734 by the memory controller 710. The data is then checked in data checking engine 712. The data, if verified, and the associated MAC are saved in LLC 708, as indicated by arrow 736. The integrity tree is a tree of MAC values (a Merkel tree). Saving the MACs in the LCC may reduce the number of future memory accesses.

Figure 8:
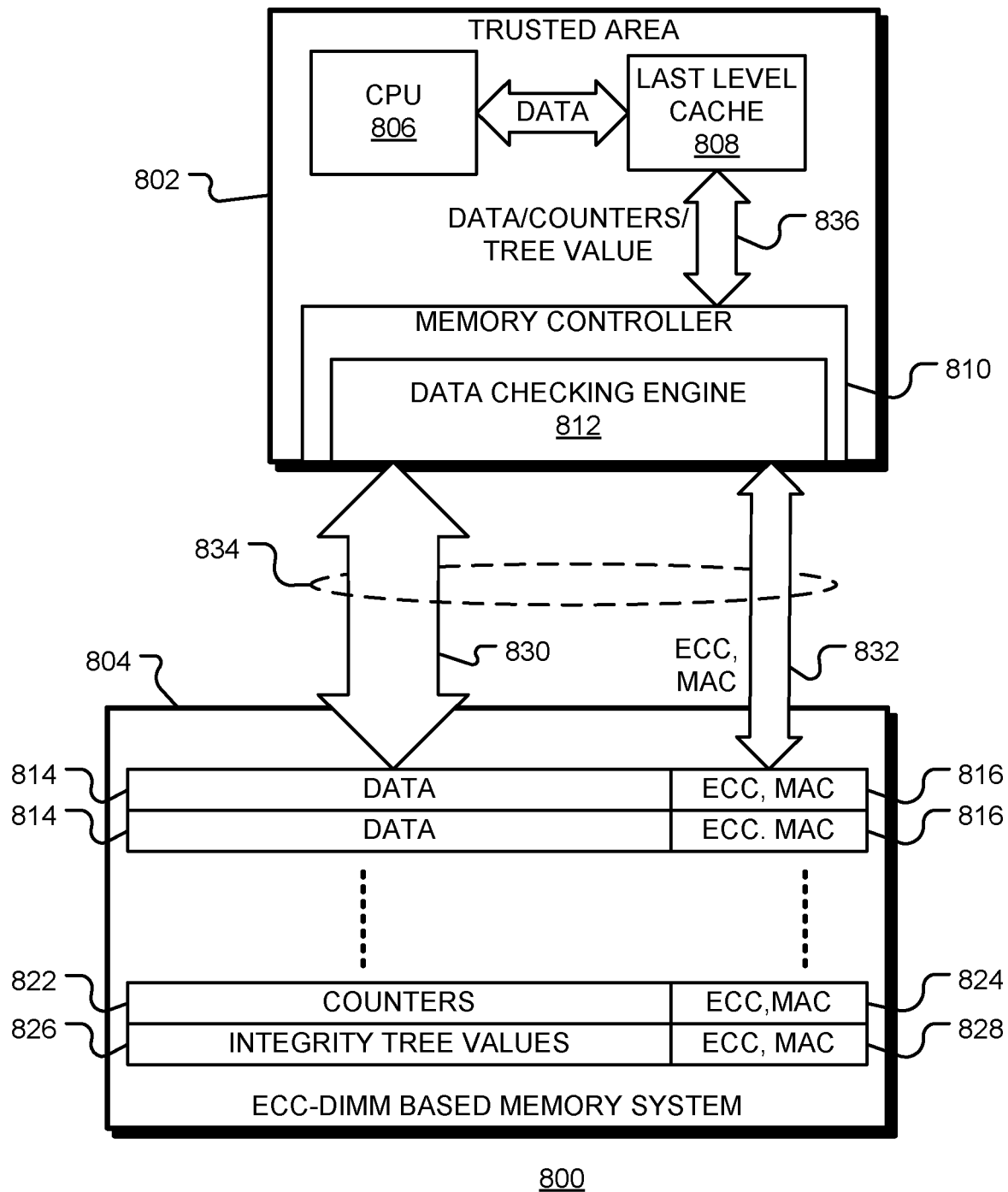
FIG. 8 is a block diagram of a data processing system with data security and reliability checking, consistent with embodiments of the disclosure.

FIG. 8 is a block diagram of a data processing system 800 with data security and reliability checking, consistent with embodiments of the disclosure. Data processing system 800 includes a trusted area 802, such as a system on a chip (SoC), and a memory system 804. The memory system may be based on ECC-DIMMs, for example. Trusted area 802 includes processing core 806 that access data in a last level cache (LLC) 808. Memory controller 810 moves data between the LLC and the off-chip memory system 804. The memory controller includes data checking engine 812. The memory system 804 stores data 814 that may be logically arranged in the memory as a number of addressable lines, which may correspond to cache lines. Associated with each line is a metadata region 816 that is used to store both an error correction code (ECC) and a MAC associated with the data 814. An additional line includes data region 822 that stores counter values, with associated ECCs in metadata region 824. Data region 826 stores integrity tree values, with associated ECCs in metadata region 828.

Data 830 from the data region of a line and ECC and MAC 832 from a metadata region of a line are read together in a single transaction 834 by the memory controller 810. The data is then checked in data checking engine 812. Counter values and integrity tree values are retrieved in additional read transactions. The data, if verified, and the counter values and integrity tree values are saved in LLC 808 as indicated by arrow 836. The integrity tree, as described above with reference to FIG. 4, is counter-based so, unlike prior systems, MAC values are not stored in the LLC. Saving the counter values and integrity tree values in the LCC can reduce the number of future memory accesses.

A further aspect of the present disclosure relates to a method for storing data in a memory module having a plurality of addressable lines, each addressable row containing a data region and a metadata region. Data and a message authentication code (MAC) are written to a first line of a memory module at a first line address, where the MAC is dependent upon the data, a first counter value and a first secret key. A plurality of counter values is written to a second line of the memory module at a second line address, where the plurality of counter values includes the first counter value. Hash values of a counter integrity tree are updated, the counter integrity tree having a root value. The node values of the counter integrity tree, exclusive of the root value, are written to one or more third lines of the memory module at one or more third line addresses. The root value of the counter integrity tree and the first secret key are stored in a trusted on-chip memory.

Data may be encrypted data before it is written to the memory module dependent upon a second secret key stored in the trusted memory.

At each write operation, the first counter value is updated. The first counter value may be a minor part of a split counter value, in which case updating the counter value comprises incrementing the minor part of the split counter value and, when the minor part rolls over, incrementing a major part of the split counter value and writing the major part to the memory module.

Writing a plurality of counter values to a second line of the memory module at the second line address may include computing metadata for the plurality of counter values and writing the plurality of counter values and the metadata to the second line of the memory module at the second line address. The metadata may be a MAC, an ECC, or both a MAC and an ECC value.

In addition, writing the node values of the counter integrity tree to one or more third line of the memory module at the one or more third line address may include computing metadata for each line of node values and writing each line of node values and the associated metadata to the memory module at a line address of the one or more third line addresses.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, controller or the like may encompass a processor, controller, microcontroller unit (MCU), microprocessor, and other suitable control elements. It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a receiver, a transmitter, a radio, signal drivers, clock circuits, power source circuits, and user input devices. As such, these functions may be interpreted as a method to perform functions in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Accordingly, some aspects and features of the disclosed embodiments are set out in the following numbered items:

1. A method for retrieving data from a memory having a plurality of addressable lines, each addressable line containing a data region and a metadata region, the method comprising: reading, in a single transaction, a first addressable line at a first address in the memory, where a metadata region of the first addressable line contains a first stored message authentication code (MAC) and an error correction code (ECC), both associated with data contained in a data region of the first addressable line; reading a plurality of counter values from a second addressable line in the memory, where the first stored MAC is generated from the data, a first counter value of the plurality of counter values and a first secret key; computing, by a data checking engine, a first computed MAC dependent upon the data, the first counter value and the first secret key; and determining the data to be reliable when the first stored MAC is equal to the first computed MAC.

2. The method of item 1, where the ECC relates to the data and the first stored MAC, the method further comprising, correcting the first stored MAC, the data, or both the first stored MAC and the data in accordance with the ECC; and when one or more bit errors in the data or the first stored MAC are corrected: re-computing the first computed MAC; and determining the data to be reliable when the first stored MAC is equal to the first computed MAC.

3. The method item 1, further comprising: reading a plurality of node values from the memory, computing, by the data checking engine, a plurality of hash values of a first counter integrity tree from the plurality of node values and the plurality of counter values; comparing the computed hash values to one or more stored hash values; and determining the data to be secure when the one or more stored hash values and the computed hash values are equal and the stored MAC and computed MAC are equal.

4. The method item 1, further comprising: storing the counter values and node values in a lowest level cache.

5. The method of item 4, where reading the plurality of node values from the memory comprises: reading a plurality of node values from a data region of a one or more third addressable lines; reading a node MAC from a metadata region of the one or more third addressable lines; reading a node error correction code (ECC) from the metadata region of the one or more third addressable lines; correcting any correctable bit errors in the node values and the node MAC dependent upon the node ECC; and determining reliability of the plurality of node values from the node MAC and the node ECC.

6. The method of item 1, where reading the plurality of counter values from the second addressable line in the memory comprises: reading the plurality of counter values from a data region of the second addressable line; reading a counter MAC from a metadata region of the second addressable line; reading a counter error correction code (ECC) from the metadata region of the second addressable line; correcting any correctable bit errors in the plurality of counter values and the counter MAC dependent upon the counter ECC; and determining reliability of the plurality of counter values from the counter MAC and the counter ECC.

7. The method of item 1, where the memory comprises a memory module having eight data chips and two metadata chips.

8. The method of item 1, where the counter values comprise minor portions of split counter values, the method further comprising: combining the minor portions of the split counter values with a major portion to form final counter values.

9. The method of item 1, where the data read from the first addressable line of the memory comprises encrypted data, the method further comprising: decrypting the encrypted data using the first counter value, the first address and a second secret key.

10. The method of item 1, where decrypting the data comprises: forming one-time-pad from the first counter value, the first address and the second secret key; and performing an XOR operation between the one-time-pad and the encrypted data.

11. The method of item 1, where computing the first computed MAC comprises: forming a cryptographic hash function from the first counter value, the first address, the first secret key and the data.

12. The method of item 1, where computing the first computed MAC is also dependent upon the first address.

13. A method for storing data in a memory having a plurality of addressable lines, each addressable row containing a data region and a metadata region, the method comprising: writing data and a message authentication code (MAC) to a first line of the memory at a first line address, where the MAC is dependent upon the data, a first counter value and a first secret key; writing a plurality of counter values to a second line of the memory at a second line address, where the plurality of counter values include the first counter value; updating node values of a counter integrity tree of counter values written to the memory, the counter integrity tree having a root value; writing the node values of the counter integrity tree, exclusive of the root value, to one or more third lines of the memory at one or more third line addresses; and storing the root value of the counter integrity tree and the first secret key in a trusted memory.

14. The method of item 13, further comprising: encrypting the data before it is written to the memory, dependent upon a second secret key, and storing the second secret key in the trusted memory.

15. The method of item 14, further comprising updating the first counter value.

16. The method of item 16, where first counter value is a minor part of a split counter value, and where updating the counter value comprises: incrementing the minor part of the split counter value; and when the minor part rolls over, incrementing a major part of the split counter value and writing the major part to the memory.

17. The method of item 14, where: writing a plurality of counter values to a second line of the memory at the second line address comprises computing metadata for the plurality of counter values and writing the plurality of counter values and the metadata to the second line of the memory at the second line address, and writing the node values of the counter integrity tree to one or more third line of the memory at the one or more third line address comprises computing metadata for each line of node values and writing each line of node values and the associated metadata to the memory at a line address of the one or more third line addresses, where the metadata comprises a MAC and an error correction code (ECC).

What is claimed is:

1. A method for retrieving data from a memory having a plurality of addressable lines, each addressable line containing a data region and a metadata region, the method comprising:
  reading, in a single transaction, a first addressable line at a first address in the memory, where a metadata region of the first addressable line contains a first stored message authentication code (MAC) and an error correction code (ECC), both associated with data contained in a data region of the first addressable line;
  reading a plurality of counter values from a second addressable line in the memory, where the first stored MAC is further associated with the data and a first counter value of the plurality of counter values;
  computing, by a data checking engine, a first computed MAC dependent upon the data, the first counter value and a first secret key; and
  determining the data to be reliable when the first stored MAC is equal to the first computed MAC.

2. The method of claim 1, where the ECC relates to the data and the first stored MAC, the method further comprising,
  correcting the first stored MAC, the data, or both the first stored MAC and the data in accordance with the ECC; and
  when one or more bit errors in the data or the first stored MAC are corrected:
    re-computing the first computed MAC; and
    determining the data to be reliable when the first stored MAC is equal to the first computed MAC.

3. The method claim 1, further comprising:
  reading a plurality of node values from the memory,
  computing, by the data checking engine, a plurality of hash values of a first counter integrity tree from the plurality of node values and the plurality of counter values;
  comparing the computed hash values to one or more stored hash values; and
  determining the data to be secure when the one or more stored hash values and the computed hash values are equal and the first stored MAC and the first computed MAC are equal.

4. The method of claim 1, further comprising:
  storing the counter values and node values in a lowest level cache.

5. The method of claim 4, where reading the plurality of node values from the memory comprises:
  reading a plurality of node values from a data region of a one or more third addressable lines;
  reading a node MAC from a metadata region of the one or more third addressable lines;
  reading a node error correction code (ECC) from the metadata region of the one or more third addressable lines;
  correcting any correctable bit errors in the node values and the node MAC dependent upon the node ECC; and
  determining reliability of the plurality of node values from the node MAC and the node ECC.

6. The method of claim 1, where reading the plurality of counter values from the second addressable line in the memory comprises:
  reading the plurality of counter values from a data region of the second addressable line;
  reading a counter MAC from a metadata region of the second addressable line;
  reading a counter error correction code (ECC) from the metadata region of the second addressable line;

18. A data processing system for retrieving data from a memory having a plurality of addressable lines, each addressable line containing a data region and a metadata region, the data processing system comprising: a memory management unit configured for: reading, in a single read transaction, data and a first stored message authentication code (MAC) associated with the data from a first addressable line at a first address in the memory, where the data is stored in the data region of the first addressable line and the MAC is stored in the metadata region of the first addressable line; and reading a plurality of counter values from a second addressable line in the memory, where the first stored MAC is generated from the data and a first counter value of the plurality of counter values and a first secret key; a data checking engine comprising a MAC generator for providing a first computed MAC from the data, the first counter value and the first secret key and logic for determining the data to be reliable when the first stored MAC is equal to the first computed MAC; and a storage device for storing the first secret key.

19. The data processing system of item 18, where the memory management unit is further configured for reading an error correction code (ECC) from the metadata region of the first addressable line in the memory, and where the data checking engine is configured for: determining if one or more bit errors in the data or the first MAC may be corrected; and determining the data to be reliable when the first stored MAC is equal to the first computed MAC after correction any bit errors in the data or the first MAC determined to be correctable.

20. The data processing system of item 18, where the data checking engine is further configured for: setting node values of nodes in an initial level of a counter integrity tree to be the plurality of counter values read from the second addressable line in the memory; and iteratively performing: computing a node value of a node in a next level of the counter integrity tree from a plurality of node values of nodes in a previous level; when a trusted value of the node in the next level is not available to the data checking engine: signaling the memory management unit to read node values of nodes in the next level of the counter integrity tree from one or more third addressable lines in the memory; otherwise: comparing the trusted node value of the node in the next level to the computed node value; and determining the data to be secure when the trusted node value and the computed node value are equal and the stored MAC and computed MAC are equal.

21. The data processing system of item 18, further comprising the memory, where the memory comprises a memory module having eight data chips and two metadata chips.

22. The data processing system of item 18, where the data read from the first addressable line of the memory comprises encrypted data and where the data checking engine is further configured for decrypting the encrypted data using the first counter value, the first address and a second secret key stored in the storage device. 1.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

correcting any correctable bit errors in the plurality of counter values and the counter MAC dependent upon the counter ECC; and determining reliability of the plurality of counter values from the counter MAC and the counter ECC.

7. The method of claim 1, where the memory comprises a memory module having eight data chips and two metadata chips.

8. The method of claim 1, where the counter values comprise minor portions of split counter values, the method further comprising:

combining the minor portions of the split counter values with a major portion to form final counter values.

9. The method of claim 1, where the data read from the first addressable line of the memory comprises encrypted data, the method further comprising:

decrypting the encrypted data using the first counter value, the first address and a second secret key.

10. The method of claim 9, where decrypting the data comprises:

forming one-time-pad from the first counter value, the first address and the second secret key; and performing an XOR operation between the one-time-pad and the encrypted data.

11. The method of claim 1, where computing the first computed MAC comprises:

forming a cryptographic hash function from the first counter value, the first address, the first secret key and the data.

12. The method of claim 1, where computing the first computed MAC is also dependent upon the first address.

13. A data processing system for retrieving data from a memory having a plurality of addressable lines, each addressable line containing a data region and a metadata region, the data processing system comprising:

a memory controller unit configured for:

reading, in a single read transaction, data, a first stored message authentication code (MAC) and an error correction code (ECC) from a first addressable line at a first address in the memory, where the data is stored in the data region of the first addressable line and the first stored MAC and the ECC are stored in the metadata region of the first addressable line and where the first stored MAC and the ECC are both associated with the data; and reading a plurality of counter values from a second addressable line in the memory, where the first stored MAC is associated with the data and a first counter value of the plurality of counter values;

a data checking engine comprising a MAC generator for providing a first computed MAC from the data, the first counter value and a first secret key and logic for determining the data to be reliable when the first stored MAC is equal to the first computed MAC; and a storage device for storing the first secret key.

14. The data processing system of claim 13, where the ECC is dependent upon the data and the first stored MAC, and where the data checking engine is configured for:

determining if one or more bit errors in the data or the first stored MAC may be corrected; and determining the data to be reliable when the first stored MAC is equal to the first computed MAC after correction any bit errors in the data or the first stored MAC that are determined to be correctable.

15. The data processing system of claim 13, where the data checking engine is further configured for:

receiving, from the memory controller unit, a plurality of node values from the memory, computing a plurality of hash values of a first counter integrity tree from the plurality of node values and the plurality of counter values;

comparing the computed hash values to one or more stored hash values; and determining the data to be secure when the one or more stored hash values and the computed hash values are equal and the first stored MAC and the first computed MAC are equal.

16. The data processing system of claim 13, further comprising the memory, where the memory comprises a memory module having eight data chips and two metadata chips.

17. The data processing system of claim 13, where the data read from the first addressable line of the memory comprises encrypted data and where the data checking engine is further configured for decrypting the encrypted data using the first counter value, the first address and a second secret key stored in the storage device.

* * * * *